US012638634B2

(12) United States Patent
Benabid et al.

(10) Patent No.: US 12,638,634 B2
(45) Date of Patent: May 26, 2026

(54) ARCHITECTURE FOR ELECTROMAGNETIC WAVEGUIDE

(71) Applicants: UNIVERSITE DE LIMOGES, Limoges (FR); CENTRE NATIONAL DE LA RECHERCHE SCIENTIFIQUE, Paris (FR)

(72) Inventors: Fetah Benabid, Le Palais-sur-Vienne (FR); Frédéric Gerome, Limoges (FR); Foued Amrani, Limoges (FR); Jonas Osorio, Limoges (FR); Frédéric Delahaye, Limoges (FR)

(73) Assignees: UNIVERSITE DE LIMOGES, Limoges (FR); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 420 days.

(21) Appl. No.: 17/754,843

(22) PCT Filed: Oct. 28, 2020

(86) PCT No.: PCT/EP2020/080319
§ 371 (c)(1),
(2) Date: Apr. 13, 2022

(87) PCT Pub. No.: WO2021/083973
PCT Pub. Date: May 6, 2021

(65) Prior Publication Data
US 2024/0118488 A1    Apr. 11, 2024

(30) Foreign Application Priority Data
Oct. 31, 2019    (FR) ........................................ 1912283

(51) Int. Cl.
*G02B 6/02*    (2006.01)
*G02B 6/032*    (2006.01)

(52) U.S. Cl.
CPC ..... *G02B 6/02328* (2013.01); *G02B 6/02347* (2013.01); *G02B 6/02357* (2013.01);
(Continued)

(58) Field of Classification Search
CPC .... G02B 6/02295; G02B 6/023–02395; G02B 6/032; G02B 6/02328;
(Continued)

(56) References Cited

U.S. PATENT DOCUMENTS 7,346,249 B2 * 3/2008 Russell ............ B29D 11/00721
385/125
2004/0013377 A1 * 1/2004 Han ................... G02B 6/02328
385/125
(Continued)

FOREIGN PATENT DOCUMENTS

CN       102298170 A    12/2011
CN       202453545 U     9/2012
(Continued)

OTHER PUBLICATIONS

Huang, X., Yoo, S. & Yong, K., "Function of second cladding layer in hollow core tube lattice fibers", Sci Rep 7, 1618 (2017), doi: 10.1038/s41598-017-01839-5, 8 pages. (Year: 2017).*
(Continued)

*Primary Examiner* — Uyen Chau N Le
(74) *Attorney, Agent, or Firm* — Greer, Burns & Crain, Ltd

(57)    ABSTRACT

An electromagnetic waveguide, such as an optical fibre, including a hollow central core surrounded by a microstructured sheath formed by an assembly of elementary cells, the microstructured sheath also including at least two elementary cells, at least one intermediate element connecting the elementary cells, the intermediate element having a cross-section with an area less than or equal to 50% of the
(Continued)

900 cross-sectional area of each of the cells that it connects, the intermediate element having a refractive index less than or equal to the refractive index of each of the elementary cells that it connects.

15 Claims, 4 Drawing Sheets

(52) U.S. Cl.
CPC ......... *G02B 6/02361* (2013.01); *G02B 6/032* (2013.01); *G02B 6/02371* (2013.01)

(58) Field of Classification Search
CPC ............ C03B 2203/14; C03B 2203/16; C03B 2203/42; C03B 37/0122; C03B 37/02781
See application file for complete search history.

(56) References Cited

U.S. PATENT DOCUMENTS

| | | | |
|---|---|---|---|
| 2004/0022508 A1 | 2/2004 | Belardi et al. | |
| 2005/0185908 A1 | 8/2005 | Roberts et al. | |
| 2005/0226578 A1* | 10/2005 | Mangan | G02B 6/02347 |
| | | | 385/125 |
| 2005/0276556 A1* | 12/2005 | Williams | C03B 37/0122 |
| | | | 385/123 |
| 2006/0088260 A1* | 4/2006 | Williams | G02B 6/02328 |
| | | | 385/125 |
| 2010/0247046 A1* | 9/2010 | Dong | C03B 37/0122 |
| | | | 264/1.28 |
| 2016/0002089 A1* | 1/2016 | Matsuo | G02B 6/02347 |
| | | | 65/393 |
| 2016/0124144 A1* | 5/2016 | Benabid | B29D 11/00663 |
| | | | 385/125 |
| 2016/0236964 A1 | 8/2016 | Fokoua et al. | |
| 2016/0320556 A1* | 11/2016 | Nasilowski | H01S 3/1608 |
| 2019/0011634 A1* | 1/2019 | Lyngsøe | C03B 37/0122 |
| 2020/0115270 A1* | 4/2020 | Yoo | G02B 6/02361 |
| 2020/0278491 A1* | 9/2020 | Poletti | G02B 6/02357 |
| 2021/0311250 A1* | 10/2021 | Jasion | G02B 6/032 |
| 2022/0227658 A1* | 7/2022 | Rosenberger | C03B 37/02781 |

FOREIGN PATENT DOCUMENTS

| | | | | |
|---|---|---|---|---|
| CN | 103703634 A | 4/2014 | | |
| CN | 108351465 A | 7/2018 | | |
| CN | 110333571 A | 10/2019 | | |
| EP | 2020611 A1 | 2/2009 | | |
| EP | 2345913 A1 | 7/2011 | | |
| GB | 2518420 A | 3/2015 | | |
| GB | 2562687 A | 11/2018 | | |
| GB | 2566466 A * | 3/2019 | ........ | C03B 37/0122 |
| WO | 2018169487 | 9/2018 | | |

OTHER PUBLICATIONS

Office Action received in European Application No. 20800821.9, dated Jul. 17, 2023.

Office Action received in Chinese Application No. 202080076270.4, dated Jul. 15, 2023.

French Search Report received for Application No. 1912283, dated, Jun. 19, 2020.

International Search Report and Written Opinion received for PCT/EP2020/080319, mailed Jan. 27, 2021.

Wang, Y. et al., "Low loss broadband transmission in hypocycloid-core Kagome hollow-core photonic crystal fiber," Optics Letters, Optical Society of America, vol. 36, No. 5, 2011, pp. 669-671.

* cited by examiner

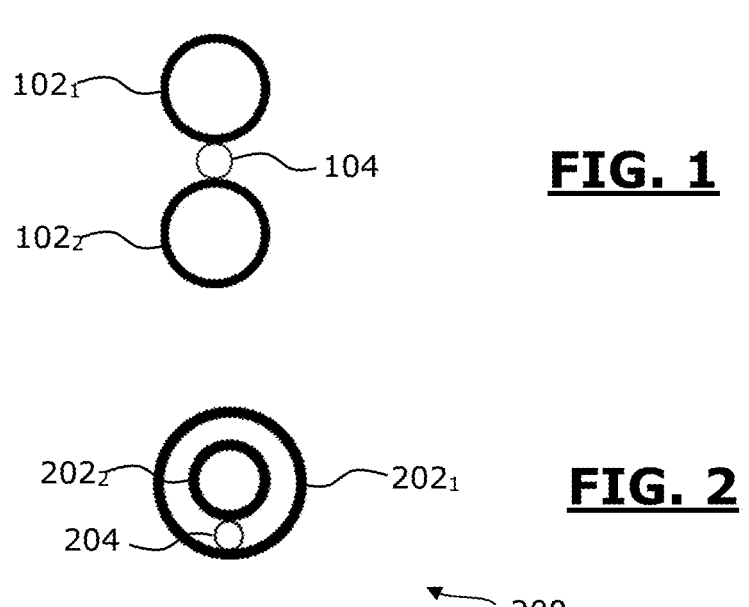
FIG. 1
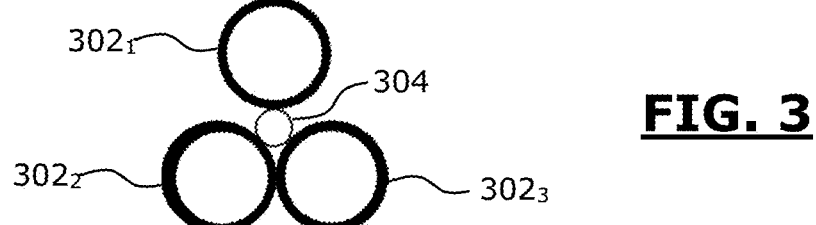
FIG. 2
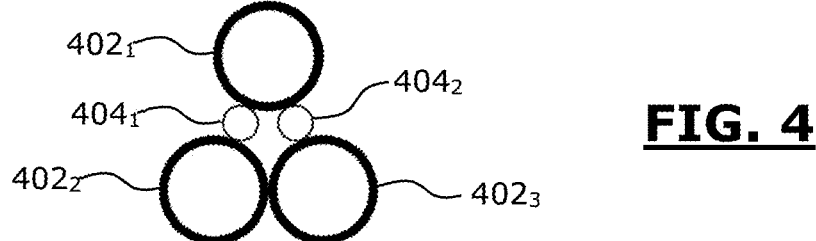
FIG. 3
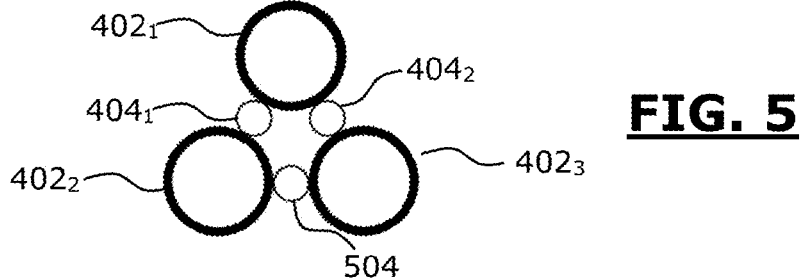
FIG. 4
FIG. 5

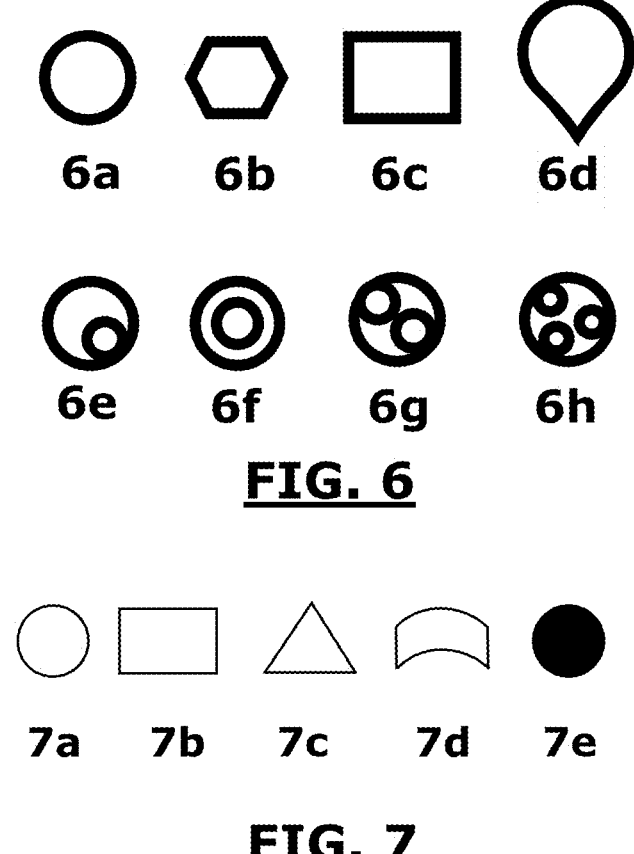
FIG. 6
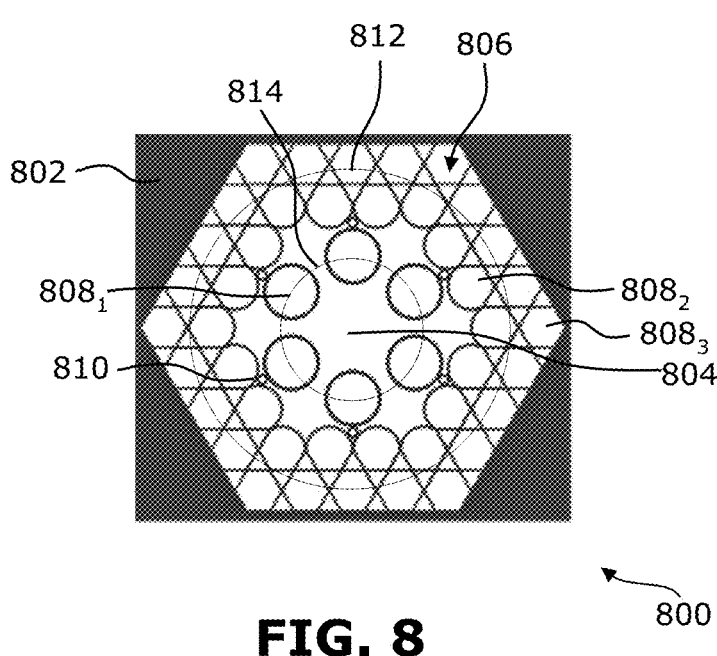
FIG. 7
FIG. 8

ARCHITECTURE FOR ELECTROMAGNETIC WAVEGUIDE

BACKGROUND

The present invention relates to a hollow electromagnetic waveguide, such as a hollow optical fibre. It also relates to a device for guiding an electromagnetic wave utilizing such a waveguide.

The field of the invention is that of hollow electromagnetic waveguides, in particular of the type using the inhibited coupling mechanism, such as hollow optical fibres.

Several types of electromagnetic waveguides are currently used or are the subject of research. Among these types of electromagnetic waveguides are hollow optical fibres such as hollow-core photonic crystal fibres or hollow fibres with microstructured sheaths.

Although the potential of these fibres exceeds that of the existing optical fibres of the state of the art, nevertheless they have certain limitations that require improvement.

In particular, producing the most optimal architecture of the fibre has to contend with production difficulties.

Thus, the hollow fibres currently known have a multi-mode behaviour, which limits their application in certain fields such as the telecommunications field. Therefore despite advances achieved in the field, it is still difficult to control the mode coupling, in particular as a result of structural and/or production limitations.

Furthermore, the current hollow fibres do not make it possible to achieve narrow bend radii, which reduces their field of application.

An aim of the present invention is to overcome at least one of these drawbacks.

Another aim of the present invention is to propose a fibre architecture allowing an ideal architecture to be attained.

Another aim of the invention is to propose an electromagnetic waveguide allowing better control of the mode coupling.

Yet another aim of the invention is to propose an electromagnetic waveguide having better guiding performance with respect to the current hollow fibres.

A further aim of the present invention is to propose an electromagnetic waveguide making it possible to use smaller bend radii than those implemented by the current hollow fibres.

SUMMARY

The invention makes it possible to achieve at least one of these aims using an electromagnetic waveguide, such as an optical fibre, comprising a hollow central core surrounded by a microstructured sheath formed by an assembly of elementary cells, characterized in that said microstructured sheath also comprises, between at least two elementary cells, at least one intermediate element connecting said elementary cells, said intermediate element having a cross section the area of which is less than or equal to 50% of the cross-sectional area of each of said cells that it connects, said intermediate element having a refractive index less than or equal to the refractive index of each of said elementary cells that it connects.

The optical waveguide according to the invention allows better control of the mode coupling, as the presence of the intermediate elements allows greater freedom of positioning of the elementary cells within the electromagnetic waveguide with respect to the current fibres.

The invention allows an arrangement of the elementary cells without them touching one another directly, consequently reducing the kinks and sharp bends in the microstructure; these latter being the possible source of transmission losses in inhibited-coupling guidance.

The optical waveguide according to the invention has better guiding performance with respect to the current hollow fibres. Indeed, better control of the mode coupling of itself results in increased guiding performance.

Furthermore, the optical waveguide according to the invention allows smaller bend radii than the current hollow fibres. In fact, the presence of intermediate elements makes it possible to create a free space between the elementary cells so that it is possible to achieve a smaller bend radius for each elementary cell, and consequently the waveguide, compared to the hollow fibres in which the elementary cells touch one another or are fixed to one another and have very little freedom when they are bent. Thus, in the optical waveguide according to the invention, the intermediate elements perform a fastening function. For their part, the elementary cells perform a waveguide function, in particular by confining the optical wave within the hollow core of the fibre.

Each elementary cell is a capillary structure, generally tubular.

Each elementary cell can have a shape in cross section from the following shapes:
- a circle;
- a hexagon;
- a parallelogram;
- a shape referred to as that of a water droplet; or
- a shape combining at least two of the aforementioned shapes.

Advantageously, the elementary cells forming the microstructured sheath can for example comprise a majority of cells the cross sections of which have the same shape.

At least one, in particular each, intermediate element can preferentially be a capillary structure, for example tubular.

At least one, in particular each, intermediate element can have a shape in cross section from the following shapes:
- a circle;
- a parallelogram;
- a triangle; or
- a shape the contour of which is composed of two arcs of circle and two rectilinear sides.

Advantageously, at least one, in particular each, intermediate element can have a cross section the area of which is less than or equal to 30% of the cross-sectional area of each of the elementary cells that it connects.

Thus, this makes it possible to simulate an empty space between a first elementary cell and at least one second cell to which it is connected by an intermediate element that interferes to a negligible extent in the guiding, due to its small dimensions.

Advantageously, at least one, in particular each, intermediate element can be made from a single material.

Advantageously, at least one, in particular each, intermediate element can be a tubular structure comprising a wall surrounding a central zone.

This central zone can for example be solid. It can be filled with one and the same material as the material of the wall. Alternatively this zone can be filled, or formed, from a material different to that of the wall.

According to another example, this central zone can be hollow. It is thus filled with an inert gas, air or a vacuum.

Advantageously, at least one, in particular each, elementary cell connected by the intermediate element can include a peripheral wall surrounding a central zone, the thickness of the wall of said intermediate element capable of being less than 50% of the thickness of said elementary cell, or each one of said elementary cells, that it connects.

Advantageously, at least one, in particular each, elementary cell can be exclusively connected to any other elementary cell by at least one intermediate element.

In other words, at least one elementary cell is spaced out in all directions from any other elementary cell by an intermediate element.

Thus, this makes it possible to have a microstructured sheath that is less dense.

Thus, the performance in terms of control of the mode coupling and bend sensitivity of the waveguide according to the invention are improved.

Advantageously, at least one, in particular each, intermediate element can connect two elementary cells only.

Thus, this makes it possible to easily place an elementary cell in a region of the fibre that is less dense in elementary cells, for example a region close to the hollow core of the fibre.

Advantageously, at least one intermediate element can connect three adjacent elementary cells.

Thus, it is possible to obtain a microstructured sheath that is less dense, while limiting the number of intermediate elements. This makes it possible to improve the performance in terms of bend radius and mode coupling, while reducing the total diameter of the guide, the cost of production, and the complexity of the waveguide according to the invention.

Alternatively, each elementary cell can be connected to one other elementary cell only by an intermediate element.

In other words, the elementary cells are grouped in pairs, the elementary cells of each pair being connected to one another by an intermediate element.

The present invention thus makes it possible to create an optical waveguide comprising a microstructured sheath composed of pairs of distinct elementary cells, thus having a much simpler architecture.

According to an embodiment, at least one, in particular each, elementary cell can be constituted by a single cell.

Alternatively, or in addition, at least one, in particular each, elementary cell can be a cell, called hybrid, constituted by at least one first cell inserted in at least one second cell.

For at least one, in particular each, hybrid cell, the first cell can be inserted in the second without using an intermediate element. In other words, the first cell can be connected or not to the second cell.

Alternatively, or in addition, at least one, in particular each, hybrid cell can comprise at least one intermediate element between the first and the second cell.

The present invention thus makes it possible to create a hybrid elementary cell the performance of which is improved for mode coupling and bend radius.

Advantageously, the guide according to the invention can comprise a microstructured sheath comprising:

a first peripheral ring, comprising a first series of elementary cells; and a second, concentric ring, inscribed within the first peripheral ring, comprising a second series of elementary cells.

Thus, the microstructured sheath of the waveguide according to the invention comprises two zones, or rings, capable of being differently structured.

These structures can differ from one another according to several factors such as the size, the shape and/or the density of the elementary cells of which they are composed. They may also vary from one another by the use or not of intermediate elements for connecting elementary cells of which they are composed.

In addition, the structure of the second ring has a direct impact on the shape of the hollow core of the electromagnetic waveguide. Thus, for example, it is possible to form a hollow core having a hypocycloidal shape, or any other desired shape.

All these variants thus allow the controllability of the mode coupling to be improved.

Advantageously, each elementary cell of the second ring of the guide according to the invention can be connected to at least one elementary cell of the first ring, by at least one intermediate element.

The present invention allows the cells of the second ring to be spaced apart from the first ring. This allows greater freedom of positioning of elementary cells close to the centre of the optical guide and thus allows greater control of the shape of the hollow core of the optical guide.

According to an embodiment, at least one, in particular each, elementary cell can be produced from silica.

According to an embodiment, at least one, in particular each, elementary cell can be produced from:

a doped material having a higher refractive index than silica, for example of the germanium type; or a doped material having a lower refractive index than silica, for example of the fluorine or boron type.

According to an embodiment, at least one, and in particular each, intermediate element can be produced from the same material as an elementary cell.

Thus, one and the same material can be used for the elementary cells and the intermediate elements, facilitating the production of the electromagnetic waveguide according to the invention.

According to an alternative embodiment, at least one, and in particular each, intermediate element can be produced from a material different from the material of an elementary cell.

The present invention gives the possibility of reducing the costs of production by using a more cost-effective material for the intermediate elements than that used for the elementary cells.

Advantageously, the hollow central core of the guide according to the invention can be filled with an inert gas, air or a vacuum.

Advantageously, the waveguide according to the invention can comprise:

at least one jacket enclosing the microstructured sheath; and at least one intermediate element between at least one elementary cell and said jacket.

Thus, the performance of the waveguide according to the invention in terms of bend radius and mode coupling is improved.

The jacket can be produced from any insulating material.

For example, the jacket can be produced from silica, germanium, fluorine or boron.

According to another aspect of the invention, a device for guiding an electromagnetic wave utilizing an electromagnetic waveguide according to the invention is proposed.

According to an embodiment example, the device according to the invention can be a micro-machining device using a laser wave, said device comprising at least one waveguide according to the invention, provided to be passed through by said laser wave.

Alternatively, the device according to the invention can be a telecommunications device emitting and/or receiving at least one electromagnetic wave, said device comprising at least one waveguide according to the invention, provided to be passed through by said electromagnetic wave.

BRIEF DESCRIPTION OF THE DRAWINGS

Other advantages and characteristics will become apparent on examining the detailed description of an embodiment that is in no way limitative, and from the attached drawings, in which:

FIG. 1 is a diagrammatic representation of an example of two elementary cells connected by an intermediate element, and capable of being utilized in a waveguide according to the invention;

FIG. 2 is a diagrammatic representation of an example hybrid cell capable of being utilized in a waveguide according to the invention;

FIG. 3 is a diagrammatic representation of an example of three elementary cells connected by one and the same intermediate element, and capable of being utilized in a waveguide according to the invention;

FIG. 4 is a diagrammatic representation of an example elementary cell connected to two other elementary cells by intermediate elements, and capable of being utilized in a waveguide according to the invention;

FIG. 5 is a diagrammatic representation of an example elementary cell connected to two other elementary cells by intermediate elements, and capable of being utilized in a waveguide according to the invention;

FIG. 6 is a diagrammatic representation of example shapes of elementary cells capable of being utilized in a waveguide according to the invention;

FIG. 7 is a diagrammatic representation of example shapes of intermediate elements capable of being utilized in a waveguide according to the invention;

FIG. 8 is a diagrammatic representation of a non-limitative embodiment example of an electromagnetic waveguide according to the invention;

DETAILED DESCRIPTION

Figure 9:
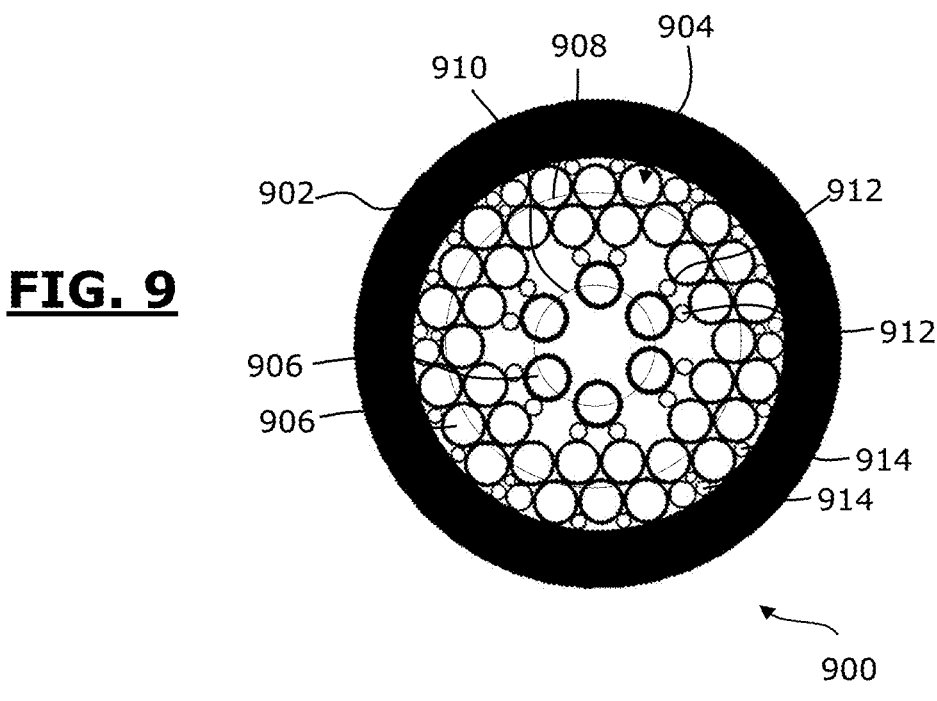
FIG. 9 is a diagrammatic representation of another non-limitative embodiment example of an electromagnetic waveguide according to the invention.

It is well understood that the embodiments that will be described hereinafter are in no way limitative. Variants of the invention can be envisaged in particular comprising only a selection of the characteristics described hereinafter, in isolation from the other characteristics described, if this selection of characteristics is sufficient to confer a technical advantage or to differentiate the invention with respect to the state of the prior art. This selection comprises at least one, preferably functional, characteristic without structural details, or with only a part of the structural details if this part alone is sufficient to confer a technical advantage or to differentiate the invention with respect to the state of the prior art.

In the figures, elements common to several figures retain the same reference.

FIG. 1 is a diagrammatic representation of an example of two elementary cells connected by an intermediate element, and capable of being utilized in a waveguide according to the invention.

FIG. 1 shows a cross-sectional view of two elementary cells $102_1$ and $102_2$, connected to one another by an intermediate element $104$.

In the example in FIG. 1, the two elementary cells $102$ are identical, and the intermediate element $104$ has a cross section the area of which is less than the cross-sectional area of each of the cells $102$ that it connects.

In the example in FIG. 1, the two elementary cells $102$ have a cross section the shape of which is identical, in this case circular. Alternatively, it is of course possible to have two cells with different shapes and/or a shape other than the circular shape.

In the example in FIG. 1, the two elementary cells $102$ have a cross section the area of which is identical. Alternatively, it is possible to have two elementary cells, the respective cross sections of which have a different area. According to the invention, the intermediate element $104$ still has a cross section the area of which is less than the cross-sectional area of each of the cells $102$ that it connects, and in particular is equal at maximum to 50% of the area of the smallest elementary cell $102$, preferentially equal at maximum to 30%.

FIG. 2 is a diagrammatic representation of an example hybrid cell capable of being utilized in a waveguide according to the invention.

FIG. 2 shows a cross-sectional view of a hybrid elementary cell $200$. This hybrid elementary cell is constituted by:
a first elementary cell $202_1$;
a second elementary cell $202_2$, inserted in the first elementary cell $202_1$; and
an intermediate element $204$ connecting the first elementary cell $202_1$ to the second elementary cell $202_2$.

Similarly to the intermediate element $104$ in FIG. 1, the intermediate element $204$ of the hybrid elementary cell $200$ has a cross section the area of which is less than the cross-sectional area of each of the cells $202$ that it connects.

The cross section of the intermediate element $204$ is for example less than or equal to 50%, preferably less than or equal to 30%, of the smallest cross section of the elementary cells $202_1$ and $202_2$, i.e. the cross section of the hybrid elementary cell $202_2$.

FIG. 3 is a diagrammatic representation of an example of three elementary cells connected by an intermediate element, and capable of being utilized in a waveguide according to the invention.

FIG. 3 shows a cross-sectional view of three elementary cells $302_1$, $302_2$ and $302_3$, connected to one another by an intermediate element $304$. The intermediate element $304$ has a cross section the area of which is less than the cross-sectional area of each of the cells $302$ that it connects.

The cross section of the intermediate element $304$ is for example less than or equal to 50%, preferably less than or equal to 30%, of the cross section of each elementary cell $302$.

In the example shown in FIG. 3, the elementary cell $302_1$ is connected to the cells $302_2$ and $302_3$ only, by the intermediate element $304$. On the other hand, the cells $302_2$ and $302_3$ are directly connected to one another as well as being connected by the intermediate element $304$.

Alternatively, it is also possible to have three elementary cells only connected to one another via one and the same intermediate element.

FIG. 4 is a diagrammatic representation of an example of three elementary cells connected by two intermediate elements, and capable of being utilized in a waveguide according to the invention.

FIG. 4 shows a cross-sectional view of an elementary cell 402₁, connected to two other elementary cells 402₂ and 402₃ respectively by intermediate elements 404₁ and 404₂. The intermediate elements 404₁ and 404₂ each have a cross section the area of which is less than the cross-sectional area of each of the cells that it connects.

The cross section of each intermediate element 404₁ and 404₂ is for example less than or equal to 50%, preferably less than or equal to 30%, of the cross section of each of the elementary cells 402₁-402₃ that it connects.

In the example shown in FIG. 4, the elementary cell 402₁ is only connected to the cells 402₂ and 402₃ by the intermediate elements 404₁ and 404₂. On the other hand, the cells 402₂ and 402₃ are directly connected to one another as well as being connected to the cell 402₁ by the intermediate element, respectively 404₁ and 404₂.

FIG. 5 is a diagrammatic representation of an example of three elementary cells connected by three intermediate elements, and capable of being utilized in a waveguide according to the invention.

The example shown in FIG. 5 comprises all the elements of the example in FIG. 4.

In addition, in the example in FIG. 5, the elementary cells 402₂ and 402₃ do not touch one another and are connected together by an intermediate element 504.

In each of the examples that have just been described with reference to FIGS. 1-5, each intermediate element 104, 204, 304, 404₁, 404₂ and 504 has a cross section the shape of which is circular.

Alternatively, it is possible to have an intermediate element having a cross section the shape of which is different.

In each of the examples that have just been described with reference to FIGS. 1-5, the elementary cells 102, 202, 302, 402 and 502 as well as the intermediate elements 104, 204, 304, 404 and 504 each have a tubular structure comprising a wall surrounding a central zone. The thickness of the wall of each intermediate element 104, 204, 304, 404 and 504 is preferably less than the thickness of the wall of each of the cells 102, 202, 302, 402 or 502 that it connects, and in particular less than or equal to 50% of the thinnest wall of the cells 102, 202, 302, 402 or 502 that it connects.

FIG. 6 is a diagrammatic representation of example shapes of elementary cells capable of being utilized in a waveguide according to the invention.

As mentioned above, the elementary cells comprised in the waveguide according to the invention can have a cross section having various shapes. The cross section of an elementary cell can thus for example have the shape of a circle 6a, a hexagon 6b, a parallelogram 6c or the shape referred to as that of a water droplet, 6d.

In addition, an elementary cell, called hybrid, can have as cross section at least one first shape inscribed within a second shape, these shapes being capable of being identical or not, and being capable of having one of the aforementioned shapes.

Views 6e and 6f show hybrid cells with a cross section having the shape of a circle inscribed within another circle. The inscribed circle in views 6e and 6f is respectively in contact or not with the other circle.

Views 6g and 6h show hybrid elementary cells with a cross section having the shape of a plurality of circles inscribed within one and the same other circle. These views 6g and 6h respectively show two and three circles inscribed within one and the same other circle.

It is also possible for an elementary cell to have a cross section the shape of which is a combination of the aforementioned shapes.

FIG. 7 is a diagrammatic representation of example shapes of intermediate elements.

As mentioned above, the intermediate elements comprised in the waveguide according to the invention can have a cross section having various shapes.

The cross section of an intermediate element can thus for example have the shape of a circle 7a, a parallelogram 7b, a triangle 7c or a shape 7d the contour of which is composed of two arcs of circle and two rectilinear sides. Examples 7a-7d show intermediate elements having a tubular structure comprising a wall surrounding a central zone.

Alternatively, these intermediate elements can have a solid structure. This solid structure is either made from a single material, or comprising a wall made from a first material, surrounding a central zone filled with a second material.

Example 7e shows an intermediate element the cross section of which has the shape of a disc. This example 7e is the solid structure example, comprising a single material, similar to the example 7a having a tubular structure.

FIG. 8 is a diagrammatic representation in cross-sectional view of a non-limitative embodiment example of an electromagnetic waveguide according to the invention.

The waveguide 800 shown in FIG. 8 comprises a jacket 802, having a rectangular outer shape and a hexagonal inner shape.

The waveguide 800 also comprises a hollow core 804 surrounded by a microstructured sheath 806. The sheath 806 is formed by an assembly of elementary cells.

In the example in FIG. 8, the elementary cells have different cross sections. For example, the elementary cell 808₁ has a cross section of circular shape, the elementary cell 808₂ has a cross section in the shape of a truncated water droplet, and the elementary cell 808₃ has a cross section of hexagonal shape.

The sheath 806 also comprises intermediate elements 810 connecting elementary cells 808.

The intermediate elements 810 have a cross section the area of which is less than or equal to 30% of the cross-sectional area of the smallest of the elementary cells that it connects. In the example in FIG. 8, the intermediate elements 810 connect three adjacent elementary cells.

The sheath 806 comprises a first peripheral ring 812, comprising a first series of elementary cells and a second concentric ring 814, inscribed within the first ring 812, comprising a second series of elementary cells.

The second ring 814 comprises only a single row of elementary cells distributed along a circular path.

Each elementary cell of the second ring 814 is connected to two elementary cells of the first ring 812, by an intermediate element 810.

FIG. 9 is a diagrammatic representation in cross-sectional view of a non-limitative embodiment example of an electromagnetic waveguide according to the invention.

The waveguide 900 shown in FIG. 9 comprises a jacket 902, having a circular shape enclosing a microstructured sheath 904.

The elementary cells 906 of the microstructured sheath 904 of the waveguide 900 have a cross section the shape of which is exclusively circular.

Just like the waveguide 800 in FIG. 8, the sheath 904 of the waveguide 900 in FIG. 9 comprises a first peripheral ring 908, comprising a first series of elementary cells 906 and a second concentric ring 910, inscribed within the first ring, comprising a second series of elementary cells 906.

Unlike the example in FIG. 8, each elementary cell 906 of the second ring 910 is here connected to two elementary cells 906 of the first ring 908, by two intermediate elements 912.

The waveguide 900 in FIG. 9 also differs from the waveguide 800 in FIG. 8 in that it comprises other intermediate elements 914 connecting other elementary cells 904 within the first ring 908 together, or with the jacket 902.

Figure 10:
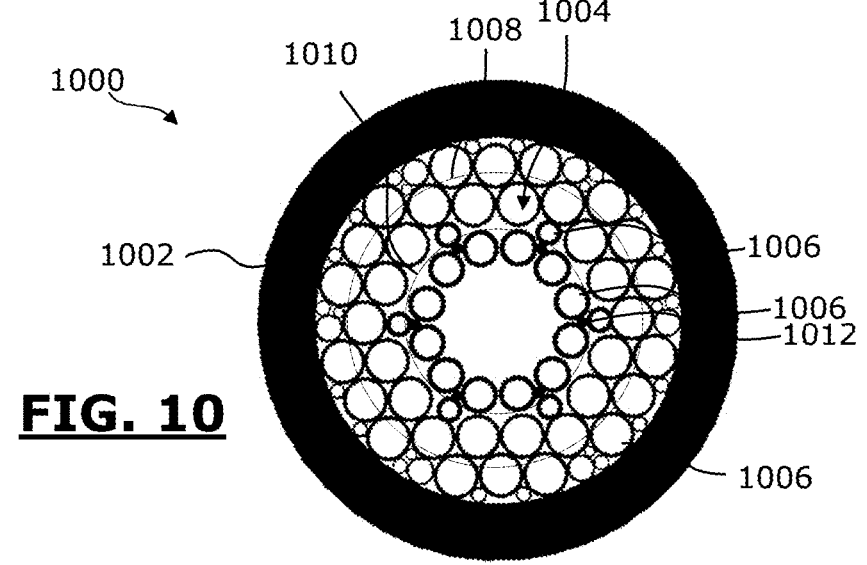
FIG. 10 is a diagrammatic representation of another non-limitative embodiment example of an electromagnetic waveguide according to the invention.

FIG. 10 is a diagrammatic representation in cross-sectional view of another non-limitative embodiment example of an electromagnetic waveguide according to the invention.

The waveguide 1000 shown in FIG. 10 comprises a jacket 1002, having a circular shape enclosing a microstructured sheath 1004.

The elementary cells 1006 of the microstructured sheath 1004 of the waveguide 1000 have a cross section the shape of which is exclusively circular.

Just like the waveguide 900 in FIG. 9, the sheath 1004 of the waveguide 1000 in FIG. 10 comprises a first peripheral ring 1008, comprising a first series of elementary cells 1006 and a second concentric ring 1010, inscribed within the first ring 1008, comprising a second series of elementary cells 1006.

Unlike the example in FIG. 9, one and the same intermediate element 1012 is used to connect two adjacent elementary cells 1006 of the second ring to one and the same cell 1006 of the first ring 1008.

Figure 11:
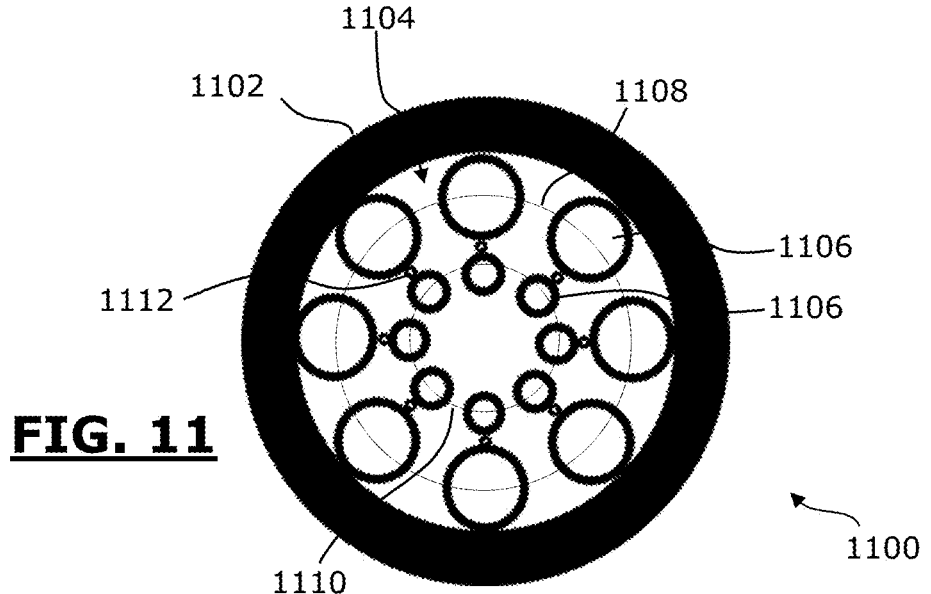
FIG. 11 is a diagrammatic representation of another non-limitative embodiment example of an electromagnetic waveguide according to the invention.

FIG. 11 is a diagrammatic representation in cross-sectional view of a non-limitative embodiment example of an electromagnetic waveguide according to the invention.

The waveguide 1100 shown in FIG. 11 comprises a jacket 1102, having a circular shape enclosing a microstructured sheath 1104.

The elementary cells 1106 of the microstructured sheath 1104 of the waveguide 1100 have a cross section the shape of which is exclusively circular.

The sheath 1104 of the waveguide 1100 in FIG. 11 comprises a first peripheral ring 1108, comprising a first series of elementary cells 1106 and a second concentric ring 1110, inscribed within the first ring 1108, comprising a second series of elementary cells 1106.

Each of the first 1108 and second 1110 rings comprises a single row of elementary cells 1106 distributed along a circular path.

The elementary cells 1106 of the first ring 1108 have a greater cross section than that of the elementary cells 1106 of the second ring 1110.

Each elementary cell 1106 of the second ring 1110 is connected to a single elementary cell 1106 of the first ring 1108 by an intermediate element 1112.

Figure 12:
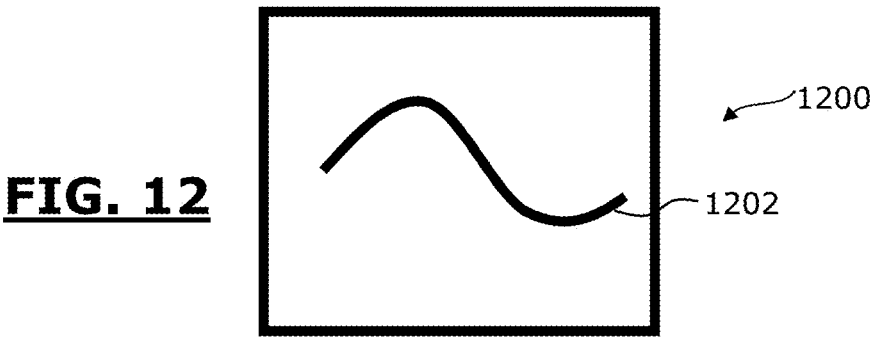
FIG. 12 is a very diagrammatic representation of a non-limitative embodiment example of a device for guiding an electromagnetic wave utilizing an electromagnetic waveguide according to the invention.

FIG. 12 is a very diagrammatic representation of a non-limitative embodiment example of a device for guiding an electromagnetic wave utilizing an electromagnetic waveguide according to the invention.

The device 1200 for guiding an electromagnetic wave comprises an electromagnetic waveguide 1202.

The electromagnetic waveguide 1202 can be that in any one of FIGS. 8-11.

The device 1200 can be for example a micro-machining device using a laser wave provided to be conveyed by the waveguide 1202.

Alternatively, the device 1200 can be a telecommunications device emitting and/or receiving at least one electromagnetic wave provided to be conveyed by the waveguide 1202.

Of course, the invention is not limited to the examples detailed above.

The invention claimed is:

1. An electromagnetic waveguide configured to an inhibited coupling guidance, comprising: a hollow central core surrounded by a microstructured sheath formed by an assembly of elementary cells, the assembly of elementary cells comprising a first peripheral ring comprising a first series of elementary cells and a second concentric ring-comprising a second series of elementary cells, the first peripheral ring and the second concentric ring being two distinct zones, at least one intermediate element connecting at least one elementary cell of the first peripheral ring with at least one elementary cell of the second concentric ring, such that the at least one elementary cell of the first peripheral ring and the at least one elementary cell of the second concentric ring are connected by the at least one intermediate element only, the at least one intermediate element having a cross section having an area, wherein the area is less than or equal to 50% of a cross-sectional area of each of the at least two elementary cells that it connects, the at least one intermediate element having a refractive index less than or equal to a refractive index of each of the at least two elementary cells that it connects, the at least one intermediate element having a tubular structure comprising a wall surrounding a central zone.

2. The waveguide according to claim 1, characterized in that the area of the cross section of the at least one intermediate element is less than or equal to 30% of the cross-sectional area of each of the at least two elementary cells that the at least one intermediate element connects.

3. The waveguide according to claim 1, characterized in that a thickness of a wall of the at least one intermediate element being less than 50% of a thickness of a peripheral wall of the at least one of the at least two elementary cells that the at least one intermediate element connects.

4. The waveguide according to claim 1, characterized in that at least one elementary cell of the second concentric ring is exclusively connected to any other elementary cell of the second concentric ring by the at least one intermediate element.

5. The waveguide according to claim 1, characterized in that the at least one intermediate element connects only one elementary cell of the first peripheral ring and one elementary cell of the second concentric ring.

6. The waveguide according to claim 1, characterized in that the at least one intermediate element connects three adjacent elementary cells of the assembly of at least one of the first peripheral ring and the second concentric ring.

7. The waveguide according to claim 1, characterized in that each elementary cell of the first peripheral ring is connected to only one elementary cell of the second concentric ring by only one said at least one intermediate element.

8. The waveguide according to claim 1, characterized in that at least one elementary cell of at least one of the first peripheral ring and the second concentric ring is constituted by a single cell.

9. The waveguide according to claim 1, characterized in that at least one elementary cell of at least one of the first peripheral ring and the second concentric ring is a cell, called hybrid, constituted by at least one first cell inserted in at least one second cell.

10. The waveguide according to claim 9, characterized in that at least one hybrid elementary cell comprises one said at least one intermediate element between the at least one first and the at least one second cell.

11. The waveguide according to claim 1, characterized in that the waveguide comprises:

at least one jacket enclosing the microstructured sheath; and at least one said intermediate element between at least one said elementary cell of the first peripheral ring and the at least one jacket.

12. A device for guiding an electromagnetic wave utilizing an electromagnetic waveguide according to claim 1.

13. The device according to claim 12, characterized in that the device is a micro-machining device using a laser wave, the device comprising at the electromagnetic waveguide, provided to be passed through by the laser wave.

14. The device according to claim 12, characterized in that the device is a telecommunications device emitting and/or receiving at least one electromagnetic wave, the device comprising the electromagnetic waveguide, provided to be passed through by the at least one electromagnetic wave.

15. The waveguide according to claim 1, characterized in that a thickness of a wall of the at least one intermediate element being less than 50% of a thickness of a peripheral wall of each one of the at least two elementary cells that it connects.

* * * * *